US012720408B2

(12) United States Patent
Porfiri et al.

(10) Patent No.: US 12,720,408 B2
(45) Date of Patent: Aug. 25, 2026

(54) ENCAPSULATING AN SCTP PACKET IN A UDP PACKET

(71) Applicant: Telefonaktiebolaget LM Ericsson (PUBL), Stockholm (SE)

(72) Inventors: Claudio Porfiri, Stockholm (SE); Carlo Vitucci, Solna (SE); Angelo Centonza, Granada (ES); Gino Luca Masini, Stockholm (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 370 days.

(21) Appl. No.: 18/551,503

(22) PCT Filed: Mar. 26, 2021

(86) PCT No.: PCT/SE2021/050272
§ 371 (c)(1),
(2) Date: Sep. 20, 2023

(87) PCT Pub. No.: WO2022/203555
PCT Pub. Date: Sep. 29, 2022

(65) Prior Publication Data
US 2024/0187966 A1 Jun. 6, 2024

(51) Int. Cl.
*H04W 40/28* (2009.01)
*H04W 40/22* (2009.01)
*H04W 40/24* (2009.01)

(52) U.S. Cl.
CPC ........... *H04W 40/28* (2013.01); *H04W 40/22* (2013.01); *H04W 40/246* (2013.01)

(58) Field of Classification Search
None
See application file for complete search history.

(56) References Cited

U.S. PATENT DOCUMENTS

2004/0088537 A1* 5/2004 Swander ............. H04L 63/0464 380/278
2010/0057929 A1* 3/2010 Merat ................... H04L 61/255 709/245

FOREIGN PATENT DOCUMENTS

CN 101834805 A 9/2010
CN 111557121 A 8/2020
(Continued)

OTHER PUBLICATIONS

M. Tuexen et al. "RFC 6951: UDP Encapsulation of Stream Control Transmission Protocol (SCTP) Packets for End-Host to End-Host Communication", May 1, 2013, RFC Editor (Year: 2013).*
(Continued)

*Primary Examiner* — Brian S Roberts
(74) *Attorney, Agent, or Firm* — Baker Botts L.L.P.

(57) ABSTRACT

It is provided a method for enabling an SCTP packet to be encapsulated in a UDP packet the method being performed by a source network node. The method comprises the steps of: obtaining a source number based on an identifier of the source network node; obtaining a destination number based on an identifier of a destination network node; generating an SCTP packet, which comprises setting a source port of the SCTP packet to a predefined port number and setting a destination port of the SCTP packet to the destination number; generating a UDP packet, which comprises setting a source port of the UDP packet to the source number and setting a destination port of the UDP packet to the destination number; encapsulating the SCTP packet in the UDP packet; and sending the UDP packet for transport to the destination network node.

17 Claims, 5 Drawing Sheets

(56) References Cited

FOREIGN PATENT DOCUMENTS

| | | | |
|---|---|---|---|
| CN | 117178538 | A | 12/2023 |
| EP | 3534587 | A1 | 9/2019 |

OTHER PUBLICATIONS

EPO Communication issued for Application No. / Patent No. 21933407.5-1206 / 4315743 PCT/SE2021050272—Nov. 18, 2024.

Michael Tuxen et al. "Network Address Translation for the Stream Control Transmission Protocol", IEEE Network—Sep./Oct. 2008.

PCT International Search Report issued for International application No. PCT/SE2021/050272—Nov. 23, 2021.

PCT Written Opinion of the International Searching Authority issued for International application No. PCT/SE2021/050272—Nov. 23, 2021.

China Patent Office, Official Action in CN Application No. 202311529580.9 dated Apr. 28, 2026 (machine translated).

* cited by examiner

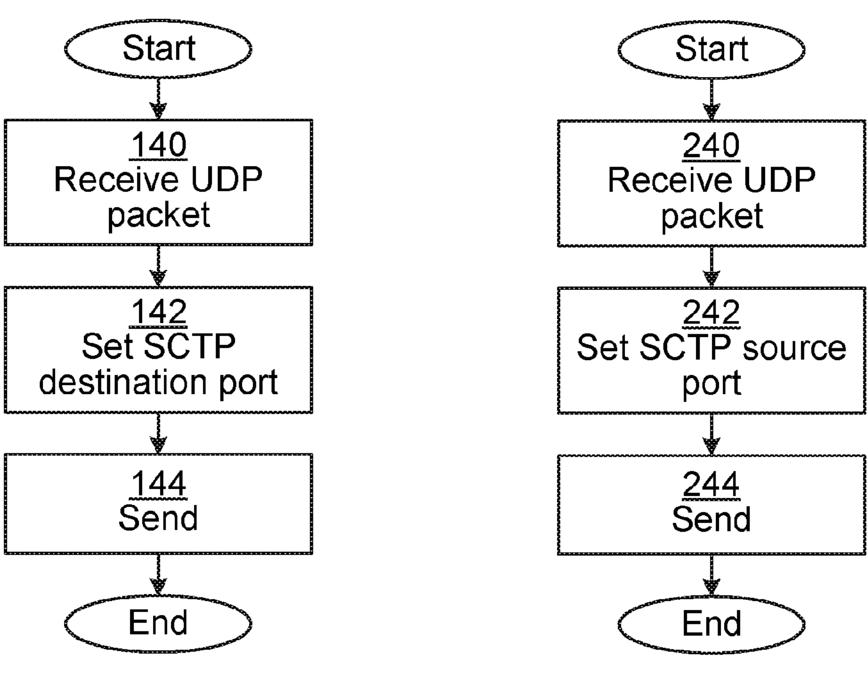
Fig. 5
Fig. 6
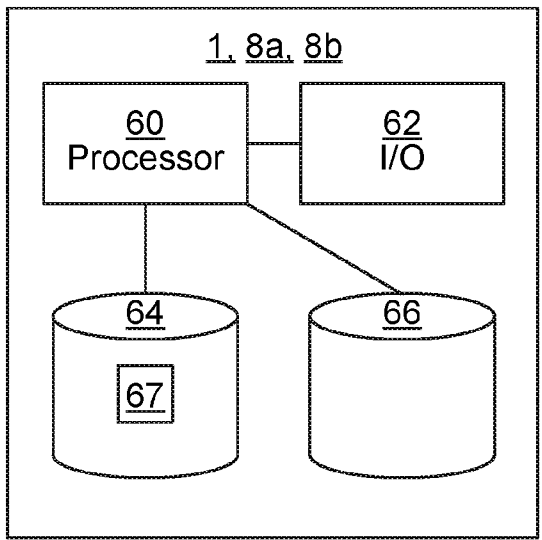
Fig. 7

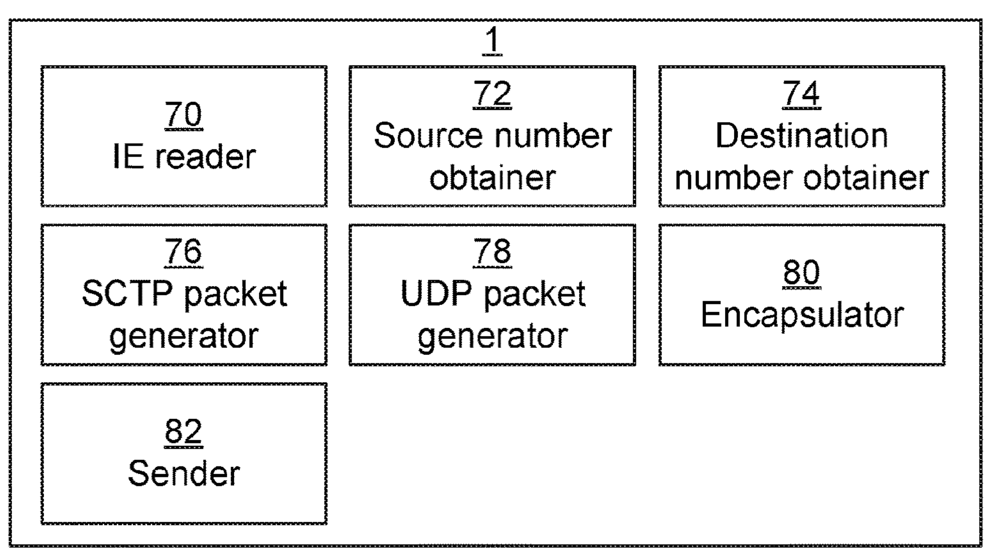
Fig. 8
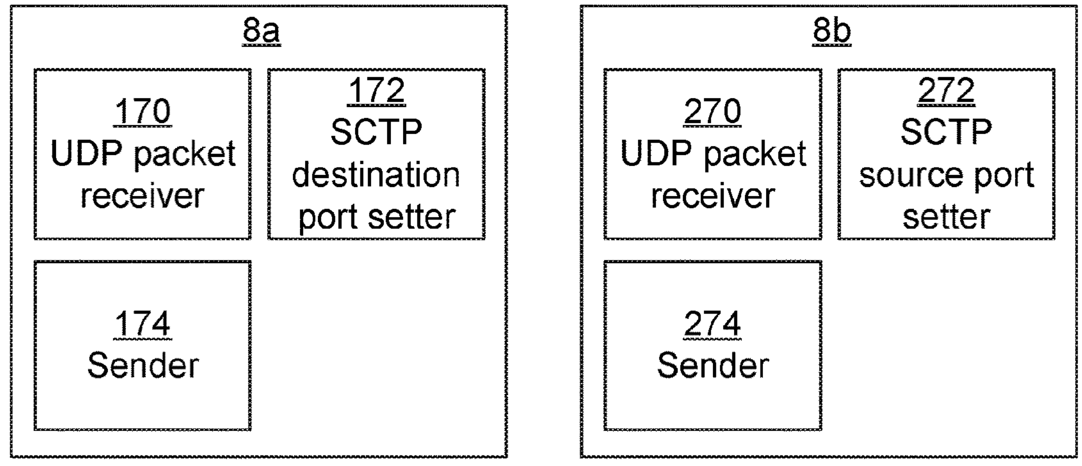
Fig. 9
Fig. 10
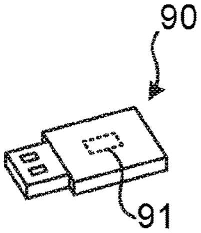
Fig. 11

ENCAPSULATING AN SCTP PACKET IN A UDP PACKET

PRIORITY

This nonprovisional application is a U.S. National Stage Filing under 35 U.S.C. § 371 of International Patent Application Serial No. PCT/SE2021/050272 filed Mar. 26, 2021 and entitled "ENCAPSULATING AN SCTP PACKET IN A UDP PACKET" which is hereby incorporated by reference in its entirety.

TECHNICAL FIELD

The present disclosure relates to the field of network communication and in particular to enabling a Stream Control Transmission protocol (SCTP) packet to be encapsulated in a User Datagram Protocol (UDP) packet, for transport from a source network node to a destination network node.

BACKGROUND

In the evolution of cellular networks, there are many different communication paths that need to be supported. One such communication path is peer-to-peer communication between network nodes.

In LTE (Long-term evolution) networks, peer-to-peer communication between network nodes occur over a so-called X2 interface and in 5G (fifth generation) networks, peer-to-peer communication between network nodes occur over a so-called Xn interface. Both the X2 interface and Xn interface are based on Stream Control Transmission Protocol (SCTP) communication over Internet Protocol (IP). Hence, each network node also needs its own IP address. However, the number of IP addresses is limited, and any reduction in the number of public IP addresses would be of great benefit.

SUMMARY

One object is to provide a solution that enables SCTP communication from a source network node to a destination network node when at least one of the source network node and the destination network node is behind a network address translation device.

According to a first aspect, it is provided a system for enabling a Stream Control Transmission protocol, SCTP, packet to be encapsulated in a User Datagram Protocol, UDP, packet, for transport from a source network node to a destination network node. The system comprises the source network node, a source adapter and a destination adapter. The source network node comprises: a processor; and a memory storing instructions that, when executed by the processor, cause the source network node to: obtain a source number based on an identifier of the source network node; obtain a destination number based on an identifier of the destination network node; generate an SCTP packet, which comprises setting a source port of the SCTP packet to a predefined port number and setting a destination port of the SCTP packet to the destination number; generate a UDP packet, which comprises setting a source port of the UDP packet to the source number and setting a destination port of the UDP packet to the destination number; encapsulating the SCTP packet in the UDP packet; and sending the UDP packet for transport to the destination network node. The source adapter comprises: a processor; and a memory storing instructions that, when executed by the processor, cause the source adapter to: receive the UDP packet encapsulating the SCTP packet; set the destination port of the SCTP packet to be the same as the port number of the source port of the SCTP packet; send the UDP packet for transport to the destination network node. The destination adapter comprises: a processor; and a memory storing instructions that, when executed by the processor, cause the destination adapter to: receive the UDP packet encapsulating the SCTP packet; set the source port in the SCTP packet to be the same as the source port of the received UDP packet; and send the UDP packet for transport to the destination network node.

According to a second aspect, it is provided a method for enabling a Stream Control Transmission protocol, SCTP, packet to be encapsulated in a User Datagram Protocol, UDP, packet, for transport from a source network node to a destination network node, the method being performed by the source network node. The method comprises the steps of: obtaining a source number based on an identifier of the source network node; obtaining a destination number based on an identifier of the destination network node; generating an SCTP packet, which comprises setting a source port of the SCTP packet to a predefined port number and setting a destination port of the SCTP packet to the destination number; generating a UDP packet, which comprises setting a source port of the UDP packet to the source number and setting a destination port of the UDP packet to the destination number; encapsulating the SCTP packet in the UDP packet; and sending the UDP packet for transport to the destination network node.

The identifier of the destination network node may be a base station identifier and the identifier of the source network node may be a base station identifier.

The step of obtaining a source number may comprise calculating a hash value in a sixteen-bit range based on the identifier of the source network node; and the step of obtaining a destination number may comprise calculating a hash value in a sixteen-bit range based on the identifier of the destination network node.

The step of obtaining a source number may comprise querying a central node for the source number based on the identifier of the source network node; and the step of obtaining a destination number may comprise querying the central node for the destination number based on the identifier of the destination network node.

The predefined port number may be a number assigned for peer-to-peer communication between network nodes.

The predefined port number may be a number assigned for 3GPP, 3: rd generation partnership project, X2 or Xn communication over SCTP.

The method may further comprise the step of: reading an information element indicating that the destination node supports distinction of intra-site base stations, wherein the information element is configured to be used for self-organisation network configuration.

According to a third aspect, it is provided a source network node for enabling a Stream Control Transmission protocol, SCTP, packet to be encapsulated in a User Datagram Protocol, UDP, packet, for transport from the source network node to a destination network node. The source network node comprises: a processor; and a memory storing instructions that, when executed by the processor, cause the source network node to: obtain a source number based on an identifier of the source network node; obtain a destination number based on an identifier of the destination network node; generate an SCTP packet, which comprises setting a source port of the SCTP packet to a predefined port number and setting a destination port of the SCTP packet to the destination number; generate a UDP packet, which comprises setting a source port of the UDP packet to the source number and setting a destination port of the UDP packet to the destination number; encapsulate the SCTP packet in the UDP packet; and send the UDP packet for transport to the destination network node.

The identifier of the destination network node may be a base station identifier and the identifier of the source network node may be a base station identifier.

The instructions to obtain a source number may comprise instructions that, when executed by the processor, cause the source network node to calculate a hash value in a sixteen-bit range based on the identifier of the source network node; and the instructions to obtain a destination number may comprise instructions that, when executed by the processor, cause the source network node to calculate a hash value in a sixteen-bit range based on the identifier of the destination network node.

The instructions to obtain a source number may comprise instructions that, when executed by the processor, cause the source network node to query a central node for the source number based on the identifier of the source network node; and the instructions to obtain a destination number may comprise instructions that, when executed by the processor, cause the source network node to query the central node for the destination number based on the identifier of the destination network node.

The predefined port number may be a number assigned for peer-to-peer communication between network nodes.

The predefined port number may be a number assigned for 3GPP, 3: rd generation partnership project, X2 or Xn communication over SCTP.

The source network may further comprise instructions that, when executed by the processor, cause the source network node to: read an information element indicating that the destination node supports distinction of intra-site base stations, wherein the information element is configured to be used for self-organisation network configuration.

According to a fourth aspect, it is provided a computer program for enabling a Stream Control Transmission protocol, SCTP, packet to be encapsulated in a User Datagram Protocol, UDP, packet, for transport from the source network node to a destination network node. The computer program comprises computer program code which, when executed on the source network node causes the source network node to: obtain a source number based on an identifier of the source network node; obtain a destination number based on an identifier of the destination network node; generate an SCTP packet, which comprises setting a source port of the SCTP packet to a predefined port number and setting a destination port of the SCTP packet to the destination number; generate a UDP packet, which comprises setting a source port of the UDP packet to the source number and setting a destination port of the UDP packet to the destination number; encapsulate the SCTP packet in the UDP packet; and send the UDP packet for transport to the destination network node.

According to a fifth aspect, it is provided a computer program product comprising a computer program according to the fourth aspect and a computer readable means on which the computer program is stored.

According to a sixth aspect, it is provided a method for enabling a Stream Control Transmission protocol, SCTP, packet to be encapsulated in a User Datagram Protocol, UDP, packet, for transport from a source network node to a destination network node, the method being performed by a source adapter. The method comprises the steps of: receiving a UDP packet encapsulating an SCTP packet; setting a destination port of the SCTP packet to be the same as the port number of the source port of the SCTP packet; and sending the UDP packet for transport to the destination network node.

The predefined port number may be a number assigned for 3GPP, 3: rd generation partnership project, X2 or Xn communication over SCTP.

According to a seventh aspect, it is provided a source adapter for enabling a Stream Control Transmission protocol, SCTP, packet to be encapsulated in a User Datagram Protocol, UDP, packet, for transport from a source network node to a destination network node. The source adapter comprises: a processor; and a memory storing instructions that, when executed by the processor, cause the source adapter to: receive a UDP packet encapsulating an SCTP packet; set a destination port of the SCTP packet to be the same as the port number of the source port of the SCTP packet; and send the UDP packet for transport to the destination network node.

The predefined port number may be a number assigned for 3GPP, 3: rd generation partnership project, X2 or Xn communication over SCTP.

According to an eighth aspect, it is provided a computer program for enabling a Stream Control Transmission protocol, SCTP, packet to be encapsulated in a User Datagram Protocol, UDP, packet, for transport from a source network node to a destination network node. The computer program comprises computer program code which, when executed on a source adapter causes the source adapter to: receive a UDP packet encapsulating an SCTP packet; set a destination port of the SCTP packet to be the same as the port number of the source port of the SCTP packet; and send the UDP packet for transport to the destination network node.

According to a ninth aspect, it is provided a computer program product comprising a computer program according to the eighth aspect and a computer readable means on which the computer program is stored.

According to a tenth aspect, it is provided a method for enabling a Stream Control Transmission protocol, SCTP, packet to be encapsulated in a User Datagram Protocol, UDP, packet, for transport from a source network node to a destination network node, the method being performed by a destination adapter. The method comprises the steps of: receiving a UDP packet encapsulating an SCTP packet; setting a source port in the SCTP packet to be the same as the source port of the received UDP packet; and sending the UDP packet for transport to the destination network node.

According to an eleventh aspect, it is provided a destination adapter for enabling a Stream Control Transmission protocol, SCTP, packet to be encapsulated in a User Datagram Protocol, UDP, packet, for transport from a source network node to a destination network node. The destination adapter comprises: a processor; and a memory storing instructions that, when executed by the processor, cause the destination adapter to: receive a UDP packet encapsulating an SCTP packet; set a source port in the SCTP packet to be the same as the source port of the received UDP packet; and send the UDP packet for transport to the destination network node.

According to a twelfth aspect, it is provided a computer program for enabling a Stream Control Transmission protocol, SCTP, packet to be encapsulated in a User Datagram Protocol, UDP, packet, for transport from a source network node to a destination network node. The computer program comprises computer program code which, when executed on a destination adapter causes the destination adapter to:

receive a UDP packet encapsulating an SCTP packet; set a source port in the SCTP packet to be the same as the source port of the received UDP packet; and send the UDP packet for transport to the destination network node.

According to a thirteenth aspect, it is provided a computer program product comprising a computer program according to twelfth and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIG. 5 is a flow chart illustrating embodiments of methods performed in the source adapter for enabling an SCTP packet to be encapsulated in a UDP packet for transport from a source network node to a destination network node;

FIG. 6 is a flow chart illustrating embodiments of methods performed in the source adapter for enabling an SCTP packet to be encapsulated in a UDP packet for transport from a source network node to a destination network node;

FIG. 7 is a schematic diagram illustrating components of each one of the source network node, the source adapter and the destination adapter of FIG. 1 according to one embodiment;

FIG. 8 is a schematic diagram showing functional modules of the source network node of FIG. 1 according to one embodiment;

FIG. 9 is a schematic diagram showing functional modules of the source adapter of FIG. 1 according to one embodiment;

FIG. 10 is a schematic diagram showing functional modules of the destination adapter of FIG. 1 according to one embodiment; and FIG. 11 shows one example of a computer program product comprising computer readable means.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
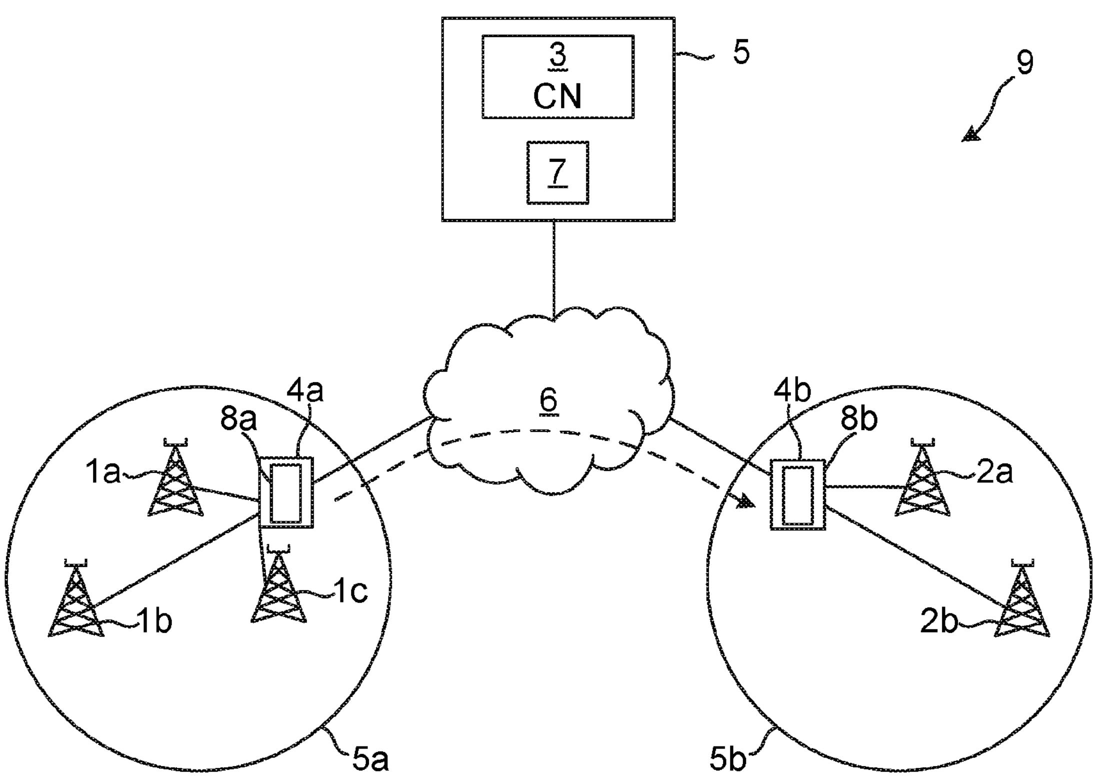
FIG. 1 is a schematic diagram illustrating an environment in which embodiments presented herein can be implemented.

FIG. 1 is a schematic diagram illustrating an environment in which embodiments presented herein can be implemented. A cellular network 9 comprises a core network 3 in a central site 5. The central site 5 may optionally comprise an additional central node 7, which is optionally part of the core network 3. The central node 7 can be implemented as a server. The core network 3 provides central functions and connection to a wide area network, such as the Internet.

In the example illustrated in FIG. 1, there is peer-to-peer communication from a source site 5*a* to a destination site 5*b*, indicated by the dashed arrow. It is to be noted that whenever the terms source and destination are used herein, these terms are used to illustrate a particular communication in that direction. However, at a later point in time, or even simultaneously, there can be communication in the opposite direction between the same or other nodes. In other words, the terms source and destination are interchangeable depending on the communication direction of each particular instance of communication.

The central site 5 is central in the way that the central site 5 is accessible to both the source site 5*a* and the destination site 5*b*.

At the source site 5*a*, there is a first source network node 1*a*, a second source network node 1*b* and a third source network node. At the destination site 5*b*, there is a first destination network node 2*a* and a second destination network node 2*b*. Embodiments presented herein facilitate the communication over 3GPP compliant SCTP from one of a source network node to a destination network node.

The source site 5*a*, the destination site 5*b* and the central site 5 are all connected via a transmission network 6 which is an Internet Protocol (IP) based network.

In order to be economical with IP number use, the source site 5*a* employs a first Network Address Translator (NAT) 4*a*, as known in the art per se. The NAT translates local IP addresses (of the source network nodes 1*a-c*) to an public IP address that is used on the transmission network 6 and vice versa, e.g. based on port numbers, to thereby enable proper routing of IP packets to and from the source network nodes 1*a-c*. Analogously, the destination site 5*b* employs a second Network Address Translator (NAT) 4*b*. Using the NATs 4*a*, 4*b*, the network nodes of each site can share a single IP address (per site) towards the transmission network 6.

According to embodiments presented herein, there is also a source adapter 8*a* at the source site 5*a* and a destination adapter 8*b* at the destination site 5*b*. The source adapter 8*a* and the destination adapter 8*b* are functional modules and do not need to be separate entities on the network; i.e. the source and destination adapters can be implemented in host devices, whereby they do not have their own IP addresses.

For instance, as illustrated in FIG. 1, the source adapter 8*a* can be implemented as part of the first NAT 4*a* and the destination adapter 8*b* can be implemented as part of the second NAT 4*b*. Alternatively, the source adapter 8*a* is implemented as part of the source network node 1 and the destination adapter 8*b* is physically implemented as part of the destination node 2. The adapters 8*a-b* modifies SCTP ports in communication between the source network node and the destination network nodes as described in more detail below.

The network nodes (also known as radio base stations) 1*a-c*, 2*a-b* are here in the form of evolved Node Bs, also known as eNode Bs or eNBs. The network nodes 1*a-c*, 2*a-b* could also be in the form of gNode Bs, or any other current or future network node as long as the embodiments presented herein are applicable. Each network node can in turn be implemented using several sub-nodes, where applicable. The network nodes 1*a-c*, 2*a-b* provide radio access over wireless communication links to instances of user equipment (UEs, not shown). The term UE is also known as mobile communication terminal, wireless device, mobile terminal, user terminal, user agent, wireless terminal, machine-to-machine device etc., and can be, for example, be implemented as what today is commonly known as a mobile phone, smartphone or a tablet/laptop with wireless connectivity.

The cellular network 9 may e.g. comply with any suitable cellular network standards, such as LTE (Long Term Evolution), LTE Advanced, 5G NR (New Radio), 6G, etc. or any other current or future wireless network, as long as the principles described hereinafter are applicable.

When a network node needs to transmit data to a peer network node, e.g. for handovers, such peer-to-peer communication can occur over an X2 interface (LTE) or Xn interface (5G). Both the X2 and the Xn interfaces are based on SCTP. Hence, SCTP packets are then transmitted from the source network node to the destination network node. According to 3GPP specifications, both the source and destination ports for SCTP when applied for X2/Xn should be set to 0x8E46, where '0x', whenever used in this document, indicates that a hexadecimal number notation is applied. In other words, 0x8E46 is the same as 36422 in decimal notation.

According to embodiments presented herein, when a source network node 1*a-c*, behind its NAT 4*a*, sends an SCTP packet to a destination network node 2*a-b*, that is behind its NAT 4*b*, instead of sending the SCTP packet directly over IP, the SCTP packet is encapsulated in a UDP packet, which, in turn is transmitted in an IP packet. The ports of the SCTP packet and the UDP packet are configured and adjusted in a specific manner to allow efficient routing and transparent transfer, as described in more detail below, enabling the network nodes to be located behind respective NATs and still support peer-to-peer communication (e.g. X2/Xn) over SCTP while complying with 3GPP specifications.

Figure 2:
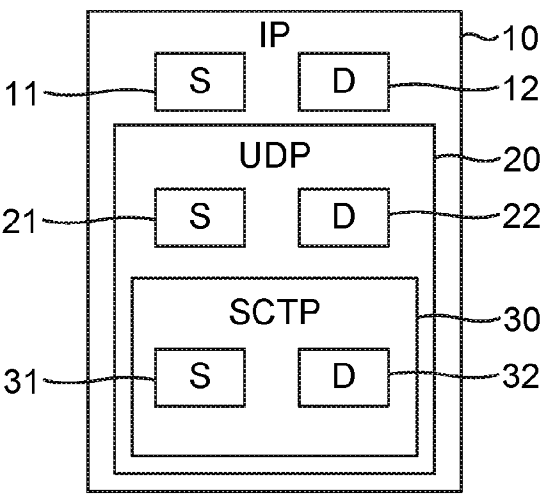
FIG. 2 is a schematic diagram illustrating an SCTP packet encapsulated in a UDP packet of an IP packet that can be used in the environment of FIG. 1.

FIG. 2 is a schematic diagram illustrating an SCTP packet encapsulated in a UDP packet of an IP packet that can be used in the environment of FIG. 1.

An IP packet 10 has a source IP address 11 and a destination IP address 12 that are part of the header of the IP packet 10. In the payload of the IP packet 10, a UDP packet 20 is provided. The UDP packet °contains a source port 21 and a destination port 22 in its header and an SCTP packet 30 in its payload. The SCTP packet 30 contains a source port 31 and a destination port 32 in its header and payload data. The payload data of the SCTP packet can e.g. relate to peer-to-peer communication (e.g. X2/Xn) between network nodes.

Figure 3:
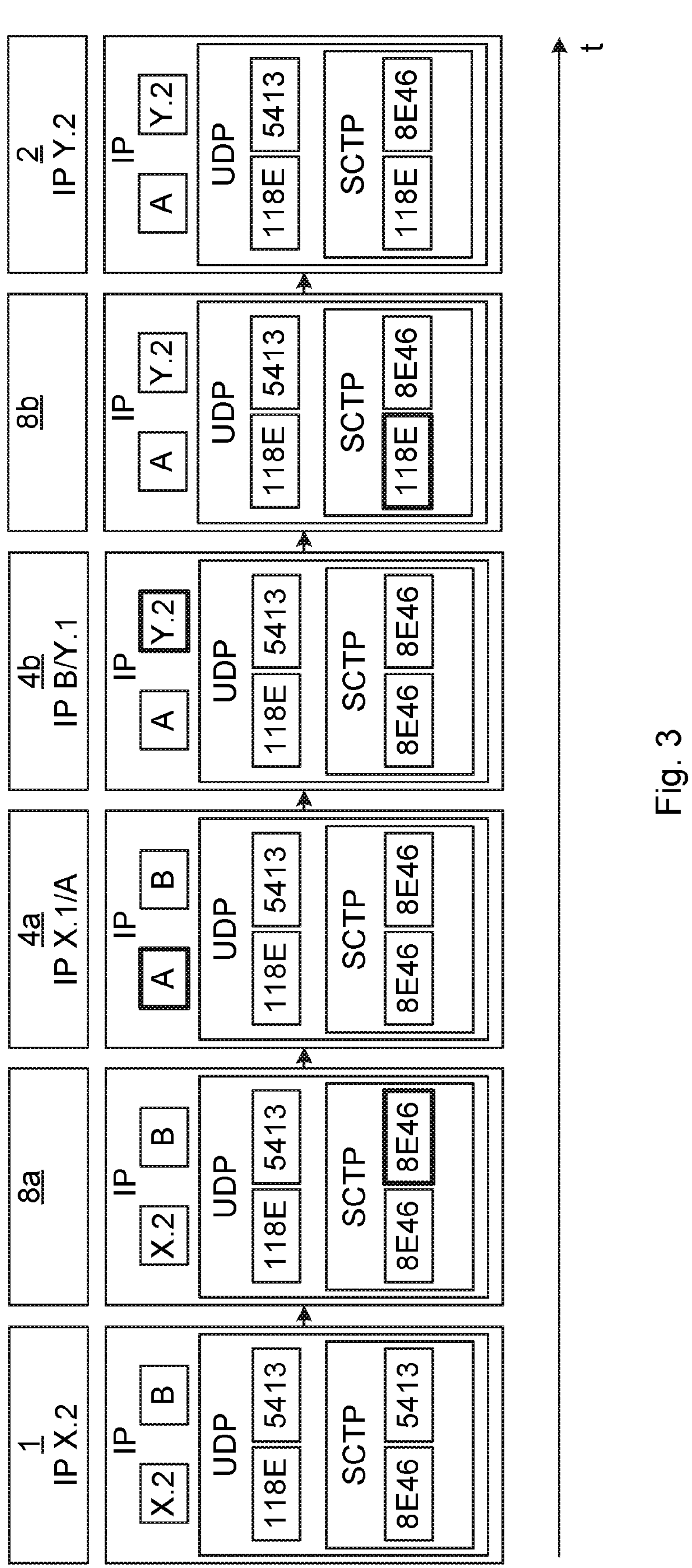
FIG. 3 is a schematic diagram illustrating the evolution of various parameters of a packet of the structure of FIG. 2 as it passes through the environment of FIG. 1.

FIG. 3 is a schematic diagram illustrating the evolution of various parameters of a packet of the structure of FIG. 2 as it passes between the nodes the environment of FIG. 1. The reference numerals of FIG. 2 are not repeated here in the interest of clarity of FIG. 3, but the IP addresses and ports are all in positions corresponding to those of FIG. 2. Time flows from left to right. Each node that is active is shown at the top of the diagram, successively from left to right, with the topmost box indicating IP address(es) of each node. Any changes in parameters of the packets are indicated in bold borders. Hence, each set of packets are shown in the way they look as transmitted from the respective node (except for the last node, the destination network node 2).

In the illustratory nomenclature used herein for IP addresses, letters without suffices, e.g. 'A' and 'B' are public IP addresses and letters with suffices, e.g. X.1, X.2, Y.1, Y.2 are local IP addresses, where the letter allows contextual differentiation herein, even if each local subnet may apply the same IP addresses, e.g. in the IP v4 private address range 192.168.0.0-192.168.255.255.

The IP addresses A and B denote the public IP addresses of the first NAT 4*a* and the second NAT 4*b*, respectively. The IP addresses X.1 and Y.1 denote the local IP addresses (also known as private IP addresses) of the first NAT 4*a* and the second NAT 4*b*, respectively. The IP address X.2 denotes the local IP address of the source network node 1 and the IP address Y.2 denotes the local IP address of the destination network node 2. In the embodiment of FIG. 3, the adapters 8*a*, 8*b* are implemented in a host device (either in one of the network nodes 1, 2 or one of the NATs 4*a*, 4*b*). Hence the source adapter 8*a* is shown without any IP address, since this is not different from the host device.

The network nodes 1, 2 have been notified by the core network about the own node identifier, and the network nodes 1, 2 know the SCTP port number to use for the SCTP service (e.g. X2/Xn). The core network provides, to the source network node, the identifier of the destination network node and the (public) IP address B of the destination network node, e.g. to enable peer-to-peer communication (e.g. X2/Xn) for handover preparation and execution. The network node identifiers can e.g. be in the form of radio access network (RAN) node IDs.

This process is used to set up an SCTP association between the source network node 1, being any one of the source network nodes 1*a-c* of FIG. 1, and the destination network node 2, being any one of the destination network nodes 2*a-b* of FIG. 1.

The embodiments presented herein are based on nodes both at the source site and the destination site being able to determine a (16-bit) source number and a (16-bit) destination number based on network node identifiers, for use when specific ports are configured. This number determination procedure is described in more detail below with reference to steps 42 and 44 of FIGS. 4A-B.

First, the source network node 1 generates the SCTP packet with the SCTP payload to send, e.g. for peer-to-peer communication from the source network node 10 to the destination network node 2. The source network node 1 is behind the first NAT 4*a* and has a local IP address X.2, part of a local network with an address range here identified by the 'X.'. The source port of the SCTP packet is the predetermined number for peer-to-peer communication for a particular service or protocol, e.g. 0x8E46 for X2/Xn communication. The destination port of the SCTP packet is set to the destination number (0x5413 in this example). A UDP packet is generated that encapsulates the SCTP packet in the UDP payload. The source port of the UDP packet is the source number (0x118E in this example) and the destination port of the UDP packet is the destination number. An IP packet is generated that carries the UDP packet. The source address of the IP packet is set to the (local) IP address X.2 of the source network node 1. The destination address of the IP packet is set to B, which is the public IP address of the destination network node 2. More specifically, the public IP address B is the public address of the second NAT 4*b*. The identification of the SCTP association (source IP address X.2, destination IP address B, SCTP source port 0x8E46, SCTP destination port 0x5413) remains unique between multiple radio network nodes in the source site. Since the SCTP destination port depends on the destination node identity, the association is locally unique, i.e. unique between multiple radio network nodes in the source site using the SCTP protocol. Even though the multiple source network nodes have the same public IP address, the network node identifiers differ, leading to different source numbers, and thus different UDP source port numbers. Once all of these parameters are set, the IP packet is sent to the source adapter 8*a*.

The source adapter 8*a* modifies the destination port of the SCTP packet and sets this to be the same as the port number of the source port of the SCTP packet, which can be the predefined number for peer-to-peer communication for the service or protocol in question, e.g. 0x8E46 for X2/Xn communication, when this is set as the source port of the SCTP packet as explained above. In this way, the SCTP packet as adapted complies with the 3GPP specifications. The source adapter 8*a* then transmits the IP packet to the first NAT 4*a*.

The first NAT 4*a* changes the source address of the IP packet from the local IP address X.2 to the public IP address A of the first NAT 4*a* and transmits the packet through the transmission network to the second NAT 4*b*. Some NATs are configurable to use source port randomisation for UDP (and/or TCP (Transport Control Protocol)). In order to keep the UDP ports to the configured ports, the source port randomisation is not used in embodiments presented herein.

As known in the art per se for NAT procedures, the second NAT 4*b* changes the destination address of the IP packet from the public IP address B to the local IP address Y.2, which corresponds to the destination node 2, that is located behind the second NAT 4*b*. The IP packet is then forwarded to the destination adapter 8*b*. The second NAT 4*b* can e.g. base the determination of the local IP address Y.2 on a table of site-local IP addresses and their corresponding UDP ports.

The destination adapter 8*b* sets the source port of the SCTP packet to the source number, i.e. the UDP source port number. In this way, the information about the SCTP source, being transported using the UDP source port, is provided to the SCTP destination (the destination network node 2) correctly, so that the SCTP association between source and destination remains unique. The destination adapter 8*b* then forwards the IP packet to the destination network node 2. It is to be noted that the source network node 1 and the destination network node (unknowingly) do not have the same SCTP port number values for their respective associations referring to the same connection. The own SCTP port number (i.e. source SCTP port for the source network node 1 and destination SCTP port for the destination SCTP network node 2) is the port number that is predefined for the service/protocol, whereas the port number for the other end is the same as the unique port number used for UDP.

Using this specific procedure of port configuration of the SCTP packet, NAT can be employed for efficient IP address use, while the SCTP packet conforms with 3GPP standards all the way between the source adapter 8*a* and the destination adapter 8*b*. Specifically, both the source port and destination port of the SCTP packet are set to the port number, 0x8E46 in this case, specified by 3GPP. This allows any diagnostics, routing, firewalls, performance and maintenance equipment, etc., to identify and evaluate communication in a conventional manner. While SCTP over UDP is known per se, see e.g. RFC6951, such a solution is not compatible to be provided behind NATs for X2/Xn communication, since the static 3GPP port numbers cannot be used to distinguish between multiple network nodes behind a NAT, and thus having the same public IP address. According to embodiments presented herein, since the destination number is used as the SCTP destination port by the source node, multiple destination nodes at the same site (thus having the same public IP address) can be addressed with the same public IP address even for the same service or protocol with their SCTP associations still being different, thus avoiding collisions between associations at the same site. Moreover, the association as seen by a source or destination network node (the two ends will see different associations) is a based on the other network node which service/protocol the association pertains to.

Since the public IP address, due to the use of NAT, no longer uniquely identifies a network node among all the network nodes behind the NAT, some other identifier is needed. For reasons of standards compliance, debugging and ease of implementation, it is desired to keep the SCTP ports to the standard ones whenever possible. Carrying SCTP over UDP over IP provides an extra pair of ports that is here exploited for this purpose. A unique port number is created from an existing unique network node id for each network node. These numbers are used for the UDP port numbers, based on the identity the source and destination node respectively (along with the NAT public IP address). For transmissions from the source network node, the destination SCTP port of an outgoing message is set to the destination UDP port, so that SCTP associations for different destination nodes within the same site are still unique. For reception by the destination network node, the source SCTP port of an incoming message has been set to the source UDP port, also to keep SCTP associations unique between destination nodes within the same destination site.

Figures 4A, 4B:
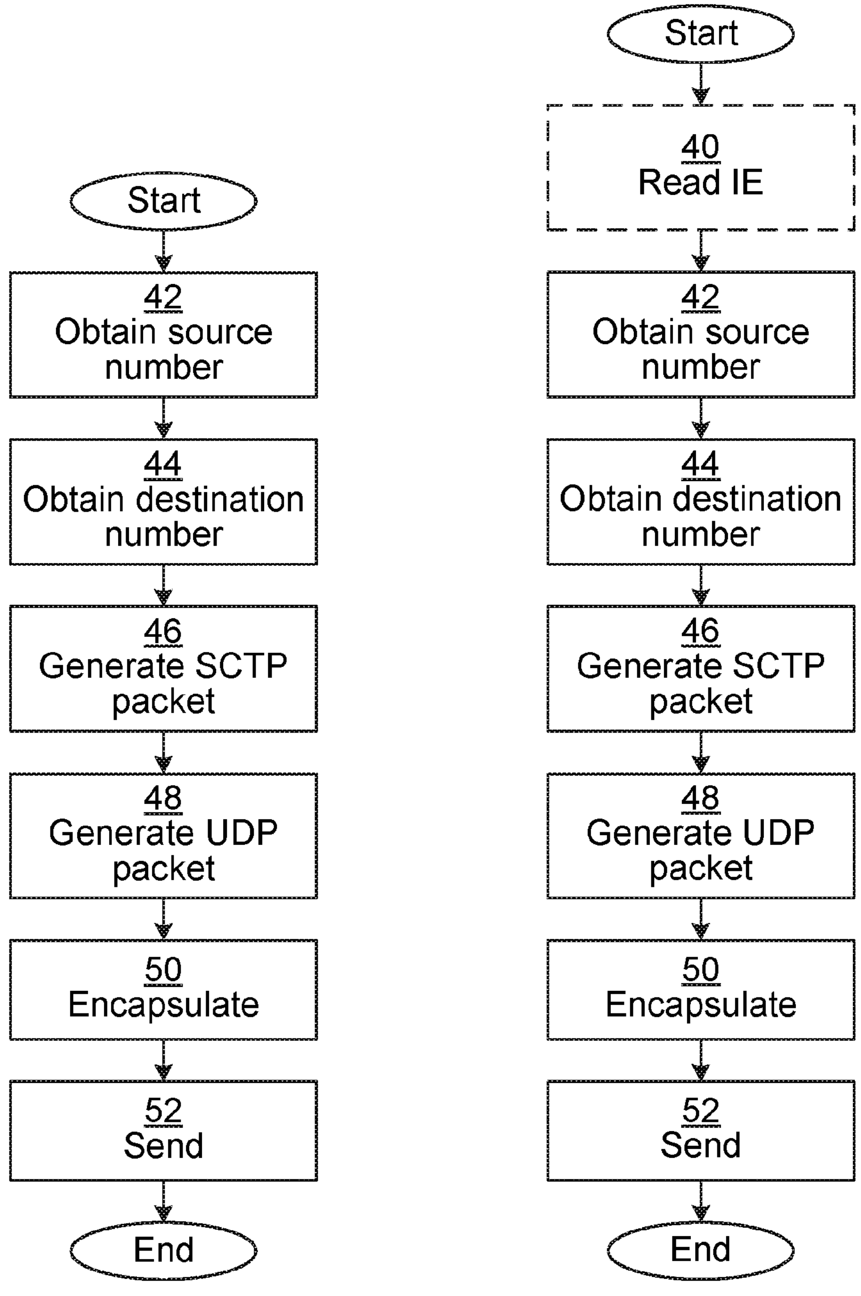
FIGS. 4A-B are flow charts illustrating embodiments of methods performed in the source network node for enabling an SCTP packet to be encapsulated in a UDP packet for transport from a source network node to a destination network node.

FIGS. 4A-B are flow charts illustrating embodiments of methods performed in the source network node for enabling an SCTP packet to be encapsulated in a UDP packet for transport from a source network node to a destination network node.

In an obtain source number step 42, the source network node obtains a source number based on an identifier of the source network node. The identifier of the source network node can be a base station identifier, also known as RAN node ID. When performing this step, the process is deterministic, consistently resulting in the same source number based on the same source network node. Moreover, the risk of two different identifiers of source network nodes resulting in the same source number is negligible, one in 65536, for 16-bit source numbers. Even so, the network installer can, during deployment, perform the source number calculation, and assign identifiers to network nodes at the same site such that the same source number never occurs in one site.

The source number can e.g. be obtained by calculating a hash value in a sixteen-bit range based on the identifier of the source network node. For instance, the source number can be obtained by performing a 16-bit hash calculation (e.g. CRC (Cyclic Redundancy Check)-16) of an input being the identifier of the source network node. Optionally, other factors can be added to the input.

The source number is later used for defining a port number, as described below. Port numbers for UDP and SCTP communication are in a 16-bit range, i.e. between 0 and (0xFFFF-1) in hexadecimal notation, or between 0 and (65536-1) as a decimal number.

In one embodiment, the source number is obtained by querying a central node 7 for the source number based on the identifier of the source network node. The central node 7 can be used to ensure that no duplicate source numbers are generated for network nodes at the same site under the same NAT (e.g. identified by public IP address of the query from the source network node). The central node 7 can perform this determination itself, or the central node 7 can query another device for this information.

In an obtain destination number step 44, the source network node obtains a destination number based on an identifier of the destination network node, in the same way that the source number is obtained, but based on a different identifier. The identifier of the destination network node can be a base station identifier (e.g. RAN node ID). In one example, the destination network node is a handover target node of a handover preparation process. When performing this step, the same identifier of the destination network node consistently results in the same destination number.

When the destination number is obtained by calculating the hash value based on the identifier of the destination network node, the destination number can be obtained by calculating a hash value in a sixteen-bit range based on the identifier of the destination network node, e.g. analogously as explained above for the source number.

When the destination number is obtained by communication with the central node, the destination number can be obtained by querying the central node 7 for the destination number based on the identifier of the destination network node, e.g. as described above for the source number.

In a generate SCTP packet step 46, the source network node generates an SCTP packet 30. The source port 31 of the SCTP packet 30 is set to a predefined port number. The destination port 32 of the SCTP packet 30 is set to the destination number, which was obtained in step 44.

The predefined port number can be a number that is assigned for peer-to-peer communication between network nodes. For instance, the predefined port number can be a number assigned for 3GPP X2 or Xn communication over SCTP. This number is defined as 0x8E46.

In a generate UDP packet step 48, the source network node generates a UDP packet. The source port 21 of the UDP packet 20 is set to the source number that was obtained in step 42. The destination port 22 of the UDP packet 20 is set to the destination number that was obtained in step 44.

In an encapsulate step 50, the source network node encapsulates the SCTP packet 30 in the UDP packet 20. In other words, the payload of the UDP packet contains the whole SCTP packet, including its headers.

In a send step 52, the source network node sends the UDP packet 20 for transport to the destination network node 2, **2*a*, 2*b***.

Looking now to FIG. 4B, only new or modified steps compared to FIG. 4A will be described.

In an optional read IE step 40, the source network node reads an information element (IE) indicating that the destination node 2, **2*a*, 2*b*** supports distinction of intra-site base stations, wherein the information element is configured to be used for self-organisation network (SON) configuration. This allows the source network node to know when the method according to embodiments presented herein is to be applied.

When signalling between source and target network node occurs for the purpose of X2/Xn setup, the IE used for that purpose indicates when the destination node 2, **2*a*, 2*b*** supports distinction of intra-site network nodes. This indication can be of use when embodiments presented herein are rolled out, and some network nodes support intra-site networks node and some network nodes do not.

Furthermore, the source network node can indicate at this time whether it supports the methods described. This indication can be used by the destination network node when it switches roles and acts as a source network node, allowing the destination network node to establish an outgoing SCTP association even before any UDP-encapsuled SCTP packets, according to this disclosure, have been received.

An example of how the enhancements to the standardized IEs can be achieved is shown in the IE shown in Table 1, based on TS38.413 v 16.1.0. This IE contains configuration information used for SON functionality. Moreover, this IE includes the network node identifier (RAN Node ID) of the IE destination and the network node identifier of the IE source.

TABLE 1

Information element

| IE/Group Name | Presence | Range | IE type and reference | Semantics description |
|---|---|---|---|---|
| Target RAN Node ID | M | | | |
| >Global RAN Node ID | M | | 9.3.1.5 | |
| >Selected TAI | M | | TAI 9.3.3.11 | |
| Source RAN Node ID | M | | | |
| >Global RAN Node ID | M | | 9.3.1.5 | |
| >Selected TAI | M | | TAI 9.3.3.11 | |
| SON Information | M | | 9.3.3.7 | |
| Xn TNL Configuration Info | C-ifSONInformationRequest | | 9.3.3.9 | Source NG-RAN node Xn TNL Configuration Info. |
| Support for Intra Site ID | O | ENUMERATED (True, . . .) | Information describing the addressing scheme to be used towards the Target RAN node | |
| Intra Site Identification Capability | O | ENUMERATED (Supported, . . .) | Information about whether the source node | |

TABLE 1-continued

| Information element | | | | |
|---|---|---|---|---|
| IE/Group Name | Presence | Range | IE type and reference | Semantics description |
| | | | supports intra site identification | |

The last two lines of the IE contain the additions for embodiments presented herein, indicating whether embodiments disclosed herein are supported.

Specifically, the field "Support for Intra Site ID" indicates, if included, that the source network node enables identification of a target node within a site assigned to a single IP address and where multiple network nodes are hosted. The node receiving this information (i.e. the destination adapter 8*b* understands that the UDP port number included in a possible procedure for Xn setup, triggered by the source node, should be used for site internal target node identification.

The field "Intra Site Identification Capability" indicates that the node sending this information is hosted by a site that supports site internal node identification as described in embodiments presented herein. The node receiving this information knows that in case e.g. an Xn interface needs to be setup with such node, intra site identification information may be used, supporting that the node sending the information is contacted in accordance with embodiments presented herein.

FIG. 5 is a flow chart illustrating embodiments of methods performed in the source adapter for enabling an SCTP packet to be encapsulated in a UDP packet for transport from a source network node to a destination network node.

In a receive UDP packet step 140, the source adapter 8*a* receives a UDP packet 20 encapsulating an SCTP packet 30.

In a set SCTP destination port step 142, the source adapter 8*a* sets a destination port 32 of the SCTP packet 30 to be the same as the port number of the source port of the SCTP packet.

As explained above, the predefined port number can be a number assigned for 3GPP X2 communication over SCTP.

In a send step 144, the source adapter 8*a* sends the UDP packet 20 for transport to the destination network node 2, 2*a*, 2*b* via the first NAT 4*a* and the second NAT 4*b*.

FIG. 6 is a flow chart illustrating embodiments of methods performed in the destination adapter for enabling an SCTP packet to be encapsulated in a UDP packet for transport from a source network node to a destination network node.

In a receive UDP packet step 240, the destination adapter 8*b* receives a UDP packet 20 encapsulating an SCTP packet 30.

In a set SCTP source port step 242, the destination adapter sets a source port 31 in the SCTP packet 30 to be the same as the source port 21 of the received UDP packet 20.

In a send step 244, the destination adapter 8*b* sends the UDP packet for transport to the destination network node 2, 2*a*, 2*b*.

The deployment of the embodiments presented herein in an existing network can be based on a staggered approach to allow that the adoption can be done without network outages. At first, all the network nodes implement the embodiments presented herein, e.g. in a software update. This can be performed on a per network node basis. An updated network node is able to operate both in a legacy mode and in a new mode (for embodiments presented herein). Until the deployment covers all network nodes, each network node still has a globally unique IP number.

When working as a server on X2/Xn, the network node listens both on IP port 0x8E46 and on SCTP/UDP at the port 0x8E46 as well as the UDP port whose number is calculated according to step 44 described above. Hence, regardless if the incoming X2/Xn traffic is in the legacy mode or new mode, the server can act upon the incoming traffic.

When behaving as a client, on X2/Xn, the network node first tries to setup outgoing association using SCTP/UDP according to the embodiments presented herein and, after a predefined timeout, it will revert back to legacy SCTP if the setup attempt fails. This behaviour is temporary and can be disables as soon as full deployment of the embodiments presented herein is completed. When the whole radio access network is adapted to the invention, SCTP/UDP only will be used for outgoing associations on X2. Once a full deployment is done, it is possible to start configuring sites with a single IP address using the NAT. Alternatively, instead of using the timeouts, the IE described above can be used to signal support for embodiments presented herein, resulting in faster association setup, especially for legacy SCTP, since the timeout does not need to expire.

Using embodiments presented herein, NATs can be employed at each site, whereby only a single public IP address is used per site. This allows multiple network nodes per site, e.g. eNodeBs, gNodeBs, etc., supporting different radio access technologies from the same site. Moreover, since the SCTP port number between the sites is set according to standards, this allows any firewall, diagnostics, performance and maintenance equipment to identify and evaluate communication based on this procedure. Also, the (3GPP standard) port numbers to not conflict with any other standard services, such as S1, NG-C, IuB, etc.

FIG. 7 is a schematic diagram illustrating components of each one of the source network node 1, the source adapter 8*a* and the destination adapter 8*b* of FIG. 1 according to one embodiment. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIGS. 4A-B (for the source network node), FIG. 5 (for the source adapter) and FIG. 6 (for the destination node) above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

An I/O interface 62 is provided for communicating with external and/or internal entities. Optionally, the I/O interface 62 also includes a user interface.

Other components are omitted in order not to obscure the concepts presented herein.

FIG. 8 is a schematic diagram showing functional modules of the source network node of FIG. 1 according to one embodiment. The modules are implemented using software instructions such as a computer program executing in the source network node. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 4A-B.

An IE reader 70 corresponds to step 40. A source number obtainer 72 corresponds to step 42. A destination number obtainer 74 corresponds to step 44. An SCTP packet generator 76 corresponds to step 46. A UDP packet generator 78 corresponds to step 48. An encapsulator 80 corresponds to step 50. A sender 82 corresponds to step 52.

FIG. 9 is a schematic diagram showing functional modules of the source adapter of FIG. 1 according to one embodiment. The modules are implemented using software instructions such as a computer program executing in the source adapter. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIG. 5.

A UDP packet receiver 170 corresponds to step 140. An SCTP destination port setter 172 corresponds to step 142. A sender 174 corresponds to step 144.

FIG. 10 is a schematic diagram showing functional modules of the destination adapter of FIG. 1 according to one embodiment. The modules are implemented using software instructions such as a computer program executing in the destination adapter. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIG. 6.

A UDP packet receiver 270 corresponds to step 240. An SCTP source port setter 272 corresponds to step 242. A sender 274 corresponds to step 244.

FIG. 21 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 7. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A system for enabling a Stream Control Transmission Protocol (SCTP) packet to be encapsulated in a User Datagram Protocol (UDP) packet, for transport from a source network node to a destination network node, the system comprising the source network node, a source adapter and a destination adapter;

wherein the source network node comprises:

a processor; and a memory storing instructions that, when executed by the processor, cause the source network node to:

obtain a source number based on an identifier of the source network node;

obtain a destination number based on an identifier of the destination network node;

generate an SCTP packet, which comprises setting a source port of the SCTP packet to a predefined port number and setting a destination port of the SCTP packet to the destination number;

generate a UDP packet, which comprises setting a source port of the UDP packet to the source number and setting a destination port of the UDP packet to the destination number;

encapsulating the SCTP packet in the UDP packet; and sending the UDP packet for transport to the destination network node;

wherein the source adapter comprises:

a processor; and a memory storing instructions that, when executed by the processor, cause the source adapter to:

receive the UDP packet encapsulating the SCTP packet;

set the destination port of the SCTP packet to be the same as the port number of the source port of the SCTP packet;

send the UDP packet for transport to the destination network node;

wherein the destination adapter comprises:

a processor; and a memory storing instructions that, when executed by the processor, cause the destination adapter to:

receive the UDP packet encapsulating the SCTP packet;

set the source port in the SCTP packet to be the same as the source port of the received UDP packet; and send the UDP packet for transport to the destination network node.

2. A method for enabling a Stream Control Transmission Protocol (SCTP) packet to be encapsulated in a User Datagram Protocol (UDP) packet, for transport from a source network node to a destination network node, the method being performed by the source network node, the method comprising the steps of:

obtaining a source number based on an identifier of the source network node;

obtaining a destination number based on an identifier of the destination network node;

generating an SCTP packet, which comprises setting a source port of the SCTP packet to a predefined port number and setting a destination port of the SCTP packet to the destination number;

generating a UDP packet, which comprises setting a source port of the UDP packet to the source number and setting a destination port of the UDP packet to the destination number;

encapsulating the SCTP packet in the UDP packet; and sending the UDP packet for transport to the destination network node.

3. The method according to claim 2, wherein the identifier of the destination network node is a base station identifier and the identifier of the source network node is a base station identifier.

4. The method according to claim 2, wherein the step of obtaining a source number comprises calculating a hash value in a sixteen-bit range based on the identifier of the source network node; and wherein the step of obtaining a destination number comprises calculating a hash value in a sixteen-bit range based on the identifier of the destination network node.

5. The method according to claim 2, wherein the step of obtaining a source number comprises querying a central node for the source number based on the identifier of the source network node; and wherein the step of obtaining a destination number comprises querying the central node for the destination number based on the identifier of the destination network node.

6. The method according to claim 2, wherein the predefined port number is a number assigned for peer-to-peer communication between network nodes.

7. The method according to claim 2, wherein the predefined port number is a number assigned for Third Generation Partnership Project (3GPP) X2 or Xn communication over SCTP.

8. The method according to claim 2, further comprising the step of:

reading an information element indicating that the destination node supports distinction of intra-site base stations, wherein the information element is configured to be used for self-organisation network configuration.

9. A source network node for enabling a Stream Control Transmission Protocol (SCTP) packet to be encapsulated in a User Datagram Protocol (UDP) packet, for transport from the source network node to a destination network node, the source network node comprising:

a processor; and a memory storing instructions that, when executed by the processor, cause the source network node to:

obtain a source number based on an identifier of the source network node;

obtain a destination number based on an identifier of the destination network node;

generate an SCTP packet, which comprises setting a source port of the SCTP packet to a predefined port number and setting a destination port of the SCTP packet to the destination number;

generate a UDP packet, which comprises setting a source port of the UDP packet to the source number and setting a destination port of the UDP packet to the destination number;

encapsulate the SCTP packet in the UDP packet; and send the UDP packet for transport to the destination network node.

10. The source network node according to claim 9, wherein the identifier of the destination network node is a base station identifier and the identifier of the source network node is a base station identifier.

11. The source network node according to claim 9, wherein the instructions to obtain a source number comprise instructions that, when executed by the processor, cause the source network node to calculate a hash value in a sixteen-bit range based on the identifier of the source network node; and wherein the instructions to obtain a destination number comprise instructions that, when executed by the processor, cause the source network node to calculate a hash value in a sixteen-bit range based on the identifier of the destination network node.

12. The source network node according to claim 9, wherein the instructions to obtain a source number comprise instructions that, when executed by the processor, cause the source network node to query a central node for the source number based on the identifier of the source network node; and wherein the instructions to obtain a destination number comprise instructions that, when executed by the processor, cause the source network node to query the central node for the destination number based on the identifier of the destination network node.

13. The source network node according to claim 9, wherein the predefined port number is a number assigned for peer-to-peer communication between network nodes.

14. The source network node according to claim 9, wherein the predefined port number is a number assigned for Third Generation Partnership Project (3GPP) X2 or Xn communication over SCTP.

15. The source network node according to claim 9, further comprising instructions that, when executed by the processor, cause the source network node to:

read an information element indicating that the destination node supports distinction of intra-site base stations, wherein the information element is configured to be used for self-organisation network configuration.

16. A source adapter for enabling a Stream Control Transmission Protocol (SCTP) packet to be encapsulated in a User Datagram Protocol (UDP) packet, for transport from a source network node to a destination network node, the source adapter comprising:

a processor; and a memory storing instructions that, when executed by the processor, cause the source adapter to:

receive a UDP packet encapsulating an SCTP packet;

set a destination port of the SCTP packet to be a same port number as a source port number of the SCTP packet; and send the UDP packet for transport to the destination network node.

17. The source adapter according to claim 16, wherein the source port number of the SCTP packet comprises a predefined port number assigned for Third Generation Partnership Project (3GPP) X2 or Xn communication over SCTP.

* * * * *